May 19, 1959  A. G. PARKER  2,886,946
THRUST REVERSING DEVICE FOR TURBOJET ENGINES
Filed April 14, 1955  4 Sheets-Sheet 1
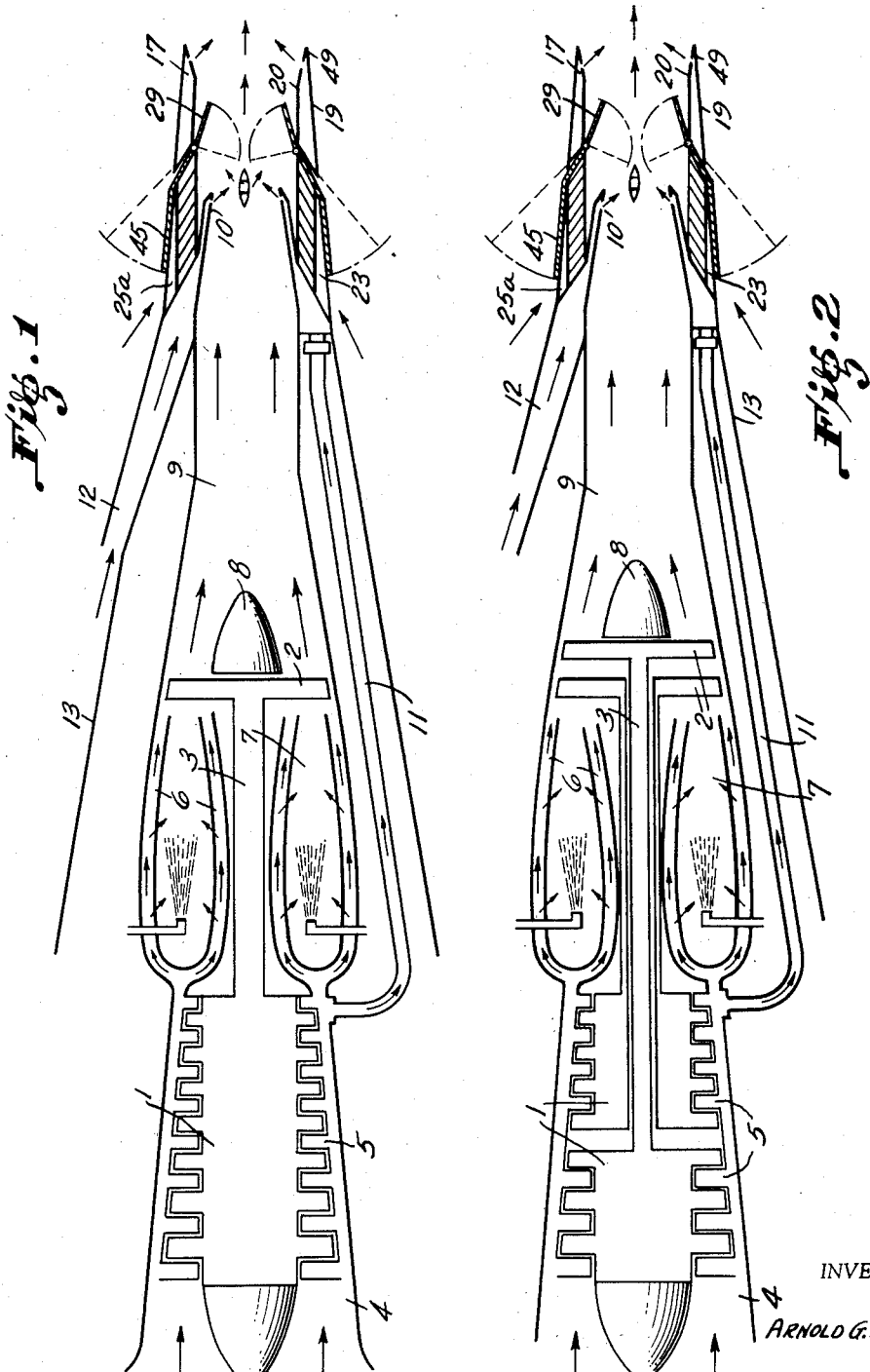
INVENTOR
ARNOLD G. PARKER
BY
Fetherstonhaugh & Co.
ATTORNEYS May 19, 1959     A. G. PARKER     2,886,946
THRUST REVERSING DEVICE FOR TURBOJET ENGINES
Filed April 14, 1955     4 Sheets-Sheet 2
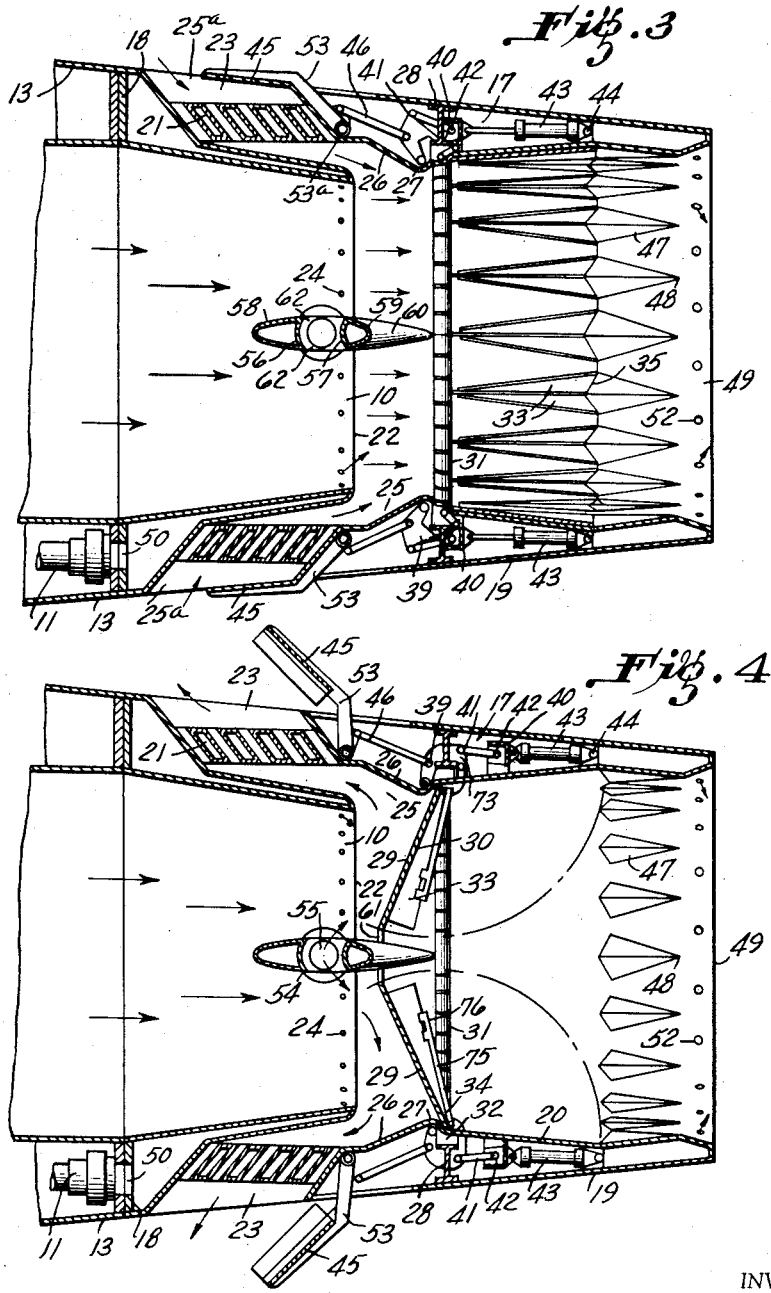
INVENTOR
ARNOLD G. PARKER
BY Fetherstonhaugh & Co.
ATTORNEY

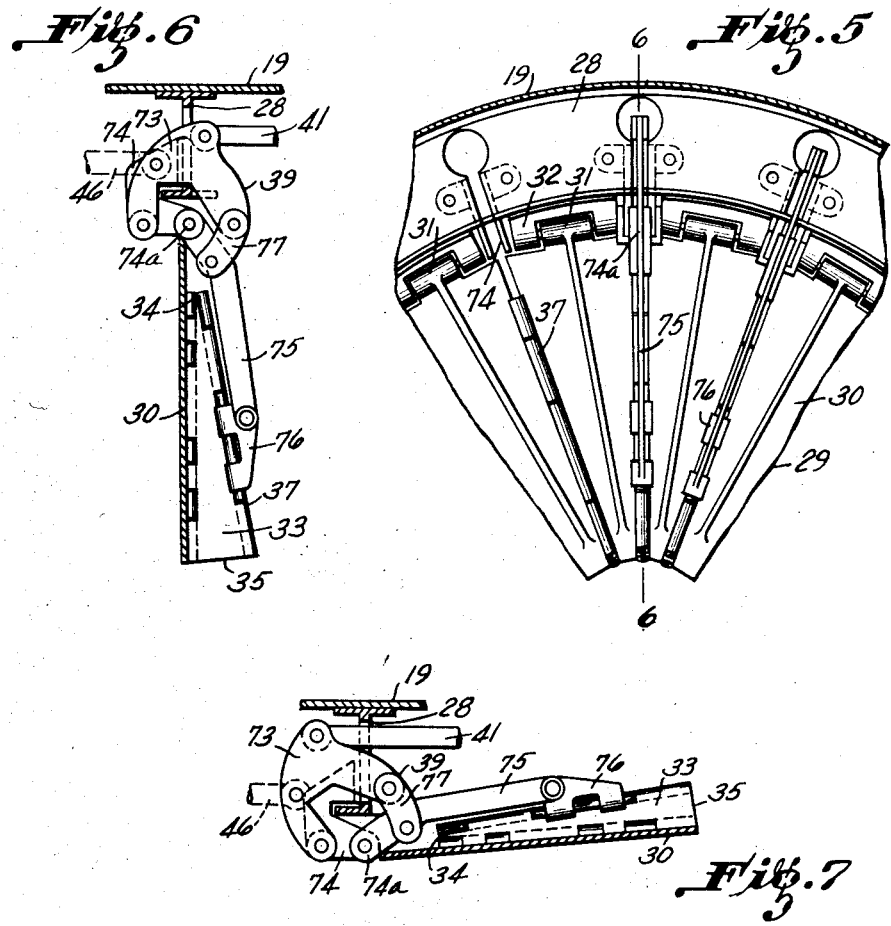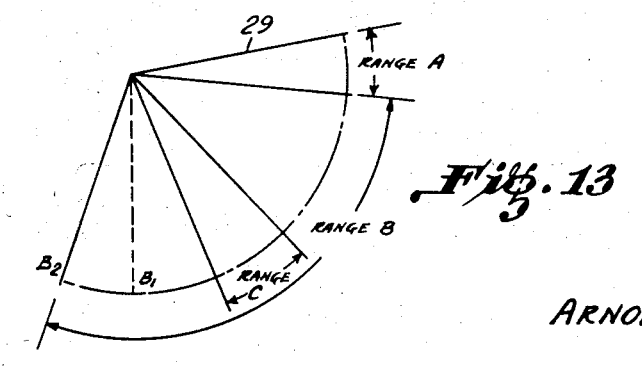

May 19, 1959 A. G. PARKER 2,886,946
THRUST REVERSING DEVICE FOR TURBOJET ENGINES
Filed April 14, 1955 4 Sheets-Sheet 4

INVENTOR
ARNOLD G. PARKER
BY Fetherstonhaugh & Co.
ATTORNEY

United States Patent Office 2,886,946
Patented May 19, 1959

2,886,946

THRUST REVERSING DEVICE FOR TURBOJET ENGINES

Arnold George Parker, Montreal, Quebec, Canada, assignor to Canadair Limited, Montreal, Quebec, Canada Application April 14, 1955, Serial No. 501,268

12 Claims. (Cl. 60—35.54)

This invention relates to jet engines and more particularly is concerned with the control of forward and reverse thrust whereby full power of the engine is utilized to increase efficiency, performance and safety of jet aircraft in all stages of operation.

The invention consists essentially in the provision of positive means whereby improved performance in jet engines is obtained by means of a variable area orifice nozzle which will function over a wide range of openings and promote broader operational range and to effect more efficient operation under changing conditions from full forward thrust position to a full reverse thrust position and which will, through the action of the deviated exhaust gases and aerodynamic brake flaps operating in conjunction with the variable area orifice nozzle, effect a braking action on the forward movement of the plane while retaining full r.p.m. of the engine for instant return to full forward thrust if required for emergency operation of the aircraft without the possibility of combustion blow out.

In the operation of jet aircraft high acceleration for take off and high deceleration for landing and the ability to vary and reverse the thrust as rapidly as required are important requirements. These can only be obtained in large measure by the control of the mass and velocity of the gas discharge. The "thrust" effecting the operation of jet aircraft and expressed in horse power of the jet discharged into the atmosphere is equal to the mass multiplied by the velocity. The greater the mass at the same velocity the greater is the thrust of the jet whether being used to effect forward or reverse thrust. By regulating the mass and velocity of the discharge and the controlled deviation of the gases, in accordance with this invention, speed and thrust control within a very close range can be effected.

The primary object of the invention is to increase the efficiency and promote broader operational range of the jet aircraft in all stages of its operation from take-off, through flight and in landing.

A further object is to provide a variable area jet nozzle for the control of forward and reverse thrust and in which the control can be exercised without the necessity of reduction in engine r.p.m. and consequently of the volume of gases expelled.

A further object is to provide a variable area jet nozzle which, as the nozzle opening is reduced beyond a certain degree will deflect a portion of the gases of combustion of the engine outwardly and forwardly of the aircraft to produce an increasing value of reverse thrust in proportion as the forward thrust is reduced.

A further object is to provide a variable area jet nozzle which is hinged radially and circumferentially and is positively controlled in any setting either automatically or manually.

A further object is to provide a variable area jet nozzle synchronously connected with brake flaps against which the gases of combustion deflected forwardly by the nozzle, impinge to increase the value of reverse thrust.

A further object is to provide a variable area jet nozzle and synchronously connected brake flaps in which the reaction forces of both nozzle and brake flaps are transferred to the aircraft structure thereby reducing the landing run of the aircraft to a reasonable value.

A further object is to provide a variable area jet nozzle having a multiple V notch profile which will result in a degree of noise suppression at various nozzle and thrust settings and will effectively reduce whirl velocity giving a more near axial flow of the rearwardly ejected gases, resulting in a greater forward thrust component.

A further object is to provide a variable area jet nozzle with which can be combined a stream of compressed air or fluid to amplify the forward thrust value of the discharged gases or combine with the deflected gases to increase the value of reverse thrust.

A further object is to provide a variable area jet nozzle of simple and rugged design which can be adapted to any type of jet engine and aircraft fairing.

The device which is the subject of the present application is self-contained within the profile of the exit nozzle of the engine tail pipe during normal flight and is therefore not subject to losses, such as leakage of gases to the atmosphere in an uncontrolled manner as is the case where variable nozzles or reverse thrust devices are mounted as an appendage of the tail pipe; it maintains a substantially concentric opening throughout the full operational range of adjustment thereby maintaining a high internal efficiency equal to that of a fixed nozzle of equal size; it contributes to a greater or less extent by its setting, as a deflector of the gases of combustion to produce a highly efficient reverse thrust without in any way producing a significant back pressure in the engine with consequent loss of r.p.m. so essential to maximum operating efficiency of jet aircraft specially during emergencies; and by reason of the inherent V-notch design of the variable area nozzle and the matching V notch design of the internal surfaces of the exit nozzle could contribute to a high degree of noise suppression when operating at high forward thrust and particularly during warming up and take-off.

In order to fully understand the nature of this invention it will be described in detail as applied to a single shaft, single-spool, single-jet engine. However, it will be fully understood that it will be apparent from the description that the device can be applied to any type of jet engine, either single or dual jet, with or without after burning installations and with various secondary thrust augmented systems as will be fully explained hereinafter and need not necessarily be installed in aircraft but could be installed in any type of device or vehicle utilizing a stream of fluid at high velocity and mass flow for varying the control of same and also to obtain a reversal of forces by reaction due to the reversal of flow.

Referring to the drawings:

Fig. 1 is a diagrammatic longitudinal sectional view of a typical single shaft, single-spool, single-jet engine showing the variable area orifice nozzle and reverse thrust deflector installed in the throat of the engine.

Fig. 2 is a view similar to Fig. 1 but showing the variable area nozzle and reverse thrust deflector applied to a twin-spool, twin-shaft, single-jet engine.

Fig. 3 is an enlarged longitudinal sectional view of the rear end only of the engines shown in Figs. 1 and 2 and showing the variable area orifice nozzle in the maximum forward thrust position and the brake flaps closing a portion of the secondary air system inlets.

Fig. 4 is a view similar to Fig. 3 but showing the variable area orifice nozzle in the minimum forward thrust position and acting as a deflector for the gases of combustion for reverse thrust and maximum braking effect.

Fig. 5 is an elevational detail of one section of the variable area orifice nozzle.

Fig. 6 is a cross section on the line 6—6 of Fig. 5.

Fig. 7 is a cross section similar to Fig. 6 but showing the various parts of the variable area orifice nozzle in the expanded or forward thrust position.

Fig. 13 is a diagram showing the operational ranges of the variable area orifice nozzle.

Figure 8:
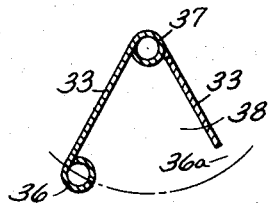
Fig. 8 is an enlarged cross-section on the line 8—8 of Fig. 10 showing the cut away hinge construction to allow the intersegmental flaps to pass through the 90° or transverse plane position of nozzle setting.

Referring to Figs. 1 and 2 of the drawings, the jet engines illustrated in diagrammatic form include the axial compressor 1 driven by the turbine 2 through the shaft 3. The inlet 4 directs the inflow of air over the blades 5 of the compressor and through the inner and outer annulus 6 of the combustion chamber 7. The combustion gases pass from the combustion chamber through the blades of the turbine 2 to rotate same at high speed and drive the compressor 1. The gases then pass over the inner exhaust cone 8 into the venturi like tube 9 where the velocity of the gases are increased to a very high value before passing through the forward primary exhaust nozzle 10 of the engine. An air bleed line 11 is shown bleeding air from the compressor 1 a percentage of cool air passing through the forward primary exhaust nozzle 10 the remainder passing through the annular outer shell 19 and inner shell 20, forming the hollow annulus 17, for cooling purposes. An air scoop 12 provides an alternative or added method of supplying cool air to the primary nozzle 10 and hollow annulus 17 if required.

Referring more particularly now to the remaining Figs. 3 to 14 of the drawings wherein the invention is disclosed in detail. The shell 17 is in the form of a hollow annulus mounted by means of the flange ring 18 on the end of the engine casing 13. The outer wall 19 of the shell 17, in the case of the single jet engine hereinafter described conforms to the configuration of the aircraft while the inner wall 20, the outer wall of the reverse duct or secondary air passages and the fixed outlet nozzle form the main tail pipe of the engine. The forward primary exhaust nozzle 10 is a part of the shell 17 and extends rearwardly from the mounting ring 18 in gradually reducing diameter to the nozzle edge 22. Within the section of the shell 17 and in its inner wall 20 between the flange ring 18 and primary nozzle edge 22, a series of secondary air passages 23 are located. These secondary air passages 23 are located around the shell 17 in suitable numbers and size to ensure the entry into the discharge path of the combustion gases of sufficient air, combined with that bled from the compressor 1 and fed through the apertures 24 in the primary nozzle 10, to augment mass flow in the primary system and cooling of the adjacent nozzle surfaces. These secondary air passages 23 are also located with respect to the empennage of the aircraft so as to not cause local turbulence at these points which would interfere with the normal and safe operation of the craft. The secondary air passages 23 are faired inwardly and rearwardly first at an angle of approximately 45° and then are directed rearwardly parallel with the wall of the primary nozzle 10 to the ejector intake openings 25a, through which cool air is induced into the primary jet stream by the ejector principle on normal operating conditions. The rear and outer wall 26 of the passages 23 are faired inwardly to a reduced diameter at 27 to form an annular shoulder or collar behind which is mounted the variable area orifice nozzle 29. An annular supporting ring 28 is fitted in the hollow annulus shell 17 at this point to provide a rigid anchorage for the variable area orifice nozzle and its operating mechanism. The variable area orifice nozzle 29 is composed of a series of tapered segments 30 pivotally hinged at 31 in the pivot brackets 32 which in turn are supported on the annular support ring 28. There can be any convenient number of these segments 30 and they are so formed that when pivoted into a position at right angles to the axis of the nozzle of the engine their edges are parallel with each other with a very small gap between. The segments 30 are joined together along their radial length by means of intersegmented flaps consisting of a pair of triangular plates 33 the apices 34 of which are located at the wider ends of the segments 30. Each of the pair of plates 33 are hinged to the radial edge of the segments 30 at 36 and are hinged together along their common edges at 37 to form a V notch configuration 38 shown in detail in Figs. 8, 9 and 12 of the drawings. This V notch configuration 38 is open and facing inwards towards the axis of the engine when the variable area orifice nozzle is expanded in the maximum forward thrust position and its triangular section narrows down until the plates 33 come parallel together when the nozzle is substantially closed into the minimum forward thrust and reverse thrust position as shown in Figs. 5 and 6.

Figure 9:
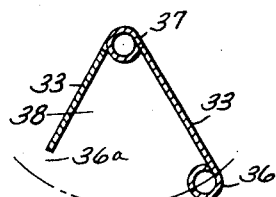
Fig. 9 is a view similar to Fig. 8 but taken on the line 9—9 of Fig. 10.
Figure 10:
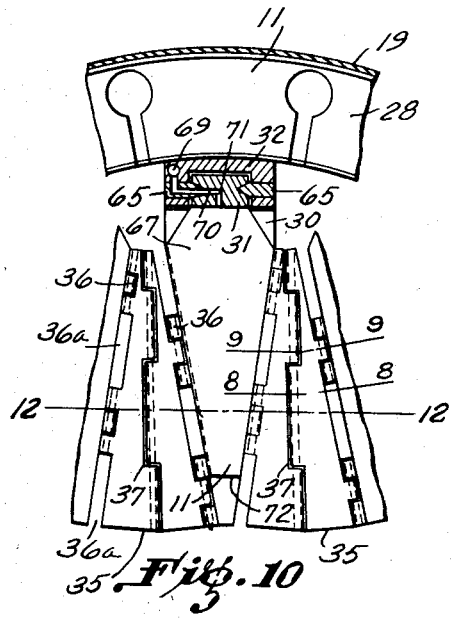
Fig. 10 is an elevational detail of the hinge construction showing the segmental flaps in contracted or reverse thrust position and showing a hollow type main segment.

In order that the variable area orifice nozzle 29 will give the best results in reverse thrust setting it is necessary that the segments 30 pass through the 90° position or at right angles to the axis of the nozzle, into a position of about 120° from the full open position or approximately 25° forward of the 90° position, the edges of the segments 30 and their hinge with the triangular plates 33 must pass through each other. In order that this can be accomplished without having gaps between the segments in the closed position of the nozzle 29, the hinges 36 on one side of the V notch are relieved or cut away at 36a with respect to the hinge on the other side of the V notch as shown in Figs. 8, 9 and 10 to bring them into alignment on a common axis when at zero notching. By this means the segments 30 can pass through the 90° or right angle position without interference with each other and the V notch will follow the segment without fouling at this point.

The segments 30 are rotated about their pivots 31 through toggle linkages 39 which in turn are connected by links 41 to a pivot point 42 on the unison ring 40. The number of these toggle linkages 39 will correspond to any desired number of segments 30 forming the variable area orifice nozzle 29. The unison ring 40 is reciprocated fore and aft by any suitable mechanism, electric, mechanical or hydraulic and is here shown as being operated by hydraulic jacks 43 anchored in the annulus shell 17 at 44, resulting in a uniform and simultaneous travel of the complete segmental nozzle assembly through its complete angular range of operation.

Directly connected with and operating in unison with the variable area orifice nozzle 29 are the brake flaps 45. The connection between the variable area orifice 29 and the flaps 45 is by means of the operating links 46 and flap arms 53 hinged at 53A and the toggle linkage 39. The linkage is so connected with the flaps 45 that when the nozzle 29 is in full positive or forward thrust position the flaps 45 will seal off a relatively large portion of the secondary air passages 23 and when the nozzle 29 is in the full negative thrust position the flaps 45 will be opened outwardly approximately parallel with the outlet 25 of the secondary air passage 23 and present a maximum of interference with the slip stream of the engine casing; in addition will receive and deflect forwardly and outwardly the combustion gases which are deflected by the nozzle segments 30 through the openings 25 into and through the passages 23 thereby adding to the value of reverse thrust without in any way interfering with the volumetric value of the combustion gases and leaving the engine running at full r.p.m. for immediate change over to full forward thrust should that be necessary. It will therefore be seen that as the area of the orifice of the nozzle 29 is decreased, reducing the volume of the rearward flow of the gases, the flaps 45 gradually open and set up a balance of pressure assisting in the closing of the aperture of the nozzle 29 against the full volume of the gases and at the same time reducing the operating loads on the interconnecting mechanism.

The V notch configuration of the segmental variable area orifice nozzle 29 is continued rearwardly by indenting the inner surface 20 of the hollow annulus 17 with similar matched V notches 47 which, at the point adjacent the outer edges 35 of the intersegmented flaps 30 match in section the V notch configuration of the nozzle 29 and tapers off to zero notch at 48 adjacent the edge of the rear exit exhaust nozzle 49. The configuration and extent of that portion of the V notch at 47 will depend to a large extent on the specific design of the variable area nozzle 29 and the rear exit exhaust nozzle 49 for any type of engine. In particular it will be designed in such a manner that it will combine with the V notch configuration of the variable area nozzle 29 so that a substantial degree of noise suppression will be obtained when the variable area nozzle is at maximum opening and a maximum volume of gases is being expelled through the rear exit exhaust nozzle 49 for full forward thrust.

The compressed air bleed ducts 11 terminate at the openings 50 in the mounting ring 18 to flood the shell 17 with cooling air. This cooling air flows around the secondary air passages 23 and is also ejected into the path of the combustion gases through the apertures 24 in the primary nozzle 10. While the cooling air flows around the secondary air passages it also flows around and through the straightening and turning vanes 21, as indicated by arrows in Fig. 14, to cool down appreciably the gases deflected by the variable area nozzle 29 for reverse thrust. Such cooling will reduce to a large extent the effects of high temperature gases striking the braking flaps 45 and the outer shell of the engine or aircraft. The cooling air also envelopes all the mechanism for the operation of the variable area orifice nozzle 29, such as the operating jacks 43 and linkage 39, 41 and 46. The compressed air in the shell 17 will be expelled through the tail cone outlets 52 assisted by the ejection principle at the exit nozzle 49 and through such openings in the inner wall 20 through which the pivot brackets 32 extend and the openings in the outer wall 19 through which the arms 53 carrying the brake flaps 45 extend.

In order to assist and enlarge the value of reverse thrust, a cross vane 54 may be installed across the throat of the shell 17. This cross vane 54 is of hollow construction with its ends being connected through the inner wall 20 to the interior of the shell 17 to receive therefrom a supply of cool air. The air passage 55 through the vane 54 is formed of a pair of turbine shaped blade walls 56 and 57, the front wall 56 being concave in shape while the rear wall 57 is convex in shape. The cross vane 54 is faired aerodynamically by the fore and aft extensions 58 and 59 with the surfaces thereof enclosing the vane walls 56 and 57 to form the passages 55. The aerodynamic fairing is further improved on the rear of the cross vane 54 by fitting a tail cone 60 which will substantially fill the central opening 61 of the variable area orifice nozzle 29 when it is in the reverse thrust position. Apertures 62 in the top and bottom of the cross vane 54 allows for the outward flow of air from the passage 55 into the path of the combustion gases. When the variable area orifice nozzle 29 is fully open for forward thrust operation the vane walls 56 and 57 direct the flow into the rearward path of the combustion gases without turbulence and when the nozzle 29 is in the closed position for reverse thrust operation, the vane walls 56 and 57 direct the flow of air outwardly over the wall created by the forward facing side of the nozzle 29 which deflects the air and combustion gases outwardly and forwardly through the reverse thrust outlets which are in effect the secondary air passages 23. The cross vane 54 is located with respect to the closed position of the variable area orifice nozzle 29 to give the most efficient deviation of the gases by the air bleed without creating turbulence in any position of the variable area nozzle 29.

Figure 11:
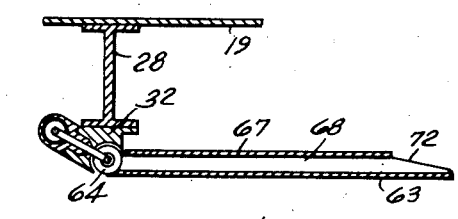
Fig. 11 is a sectional view on the line 11—11 of Fig. 10 showing the segment rotated to a forward thrust position parallel with the axis of the engine.
Figure 12:
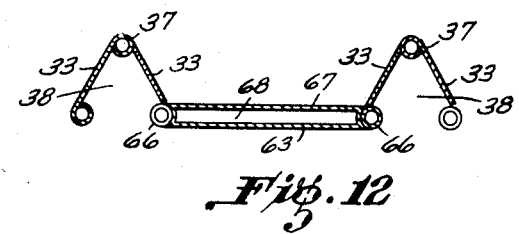
Fig. 12 is an enlarged cross section on the line 12—12 of Fig. 10.
Figure 14:
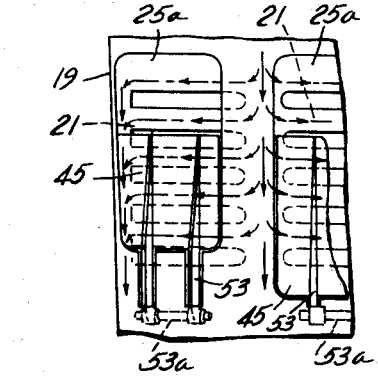
Fig. 14 is a partial outside view of the aircraft fuselage or engine casing showing the air induction inlets or combustion gas outlets with the brake flaps in the closed position and showing by chain dot lines the path of compressed cooling air around and through the straightening and turning vanes.

Having now described in general the various items making up the invention, certain features will now be described in greater detail. In Figs. 1 to 7 inclusive, the segments 30 of the variable area orifice nozzle 29 are shown as being made from flat plate either forged or cast. In Figs. 11 and 12 the segments 30 are shown as being of hollow construction for the purpose of passing cooling air through them. The forward face 63, the face which takes the full blast of high temperature combustion gases, may be forged or cast of any suitable temperature resisting material and is here shown as having pivot bearings 64 supported on the pivot pins 65. The two longitudinal edges 66 are cast hollow to form the companion hinge for the adjacent intersegmental flaps 33. These hinged edges 66 are offset from the plane of the connecting web 63 and a sheet 67 is welded or otherwise fixed across their outer edges to form the passageway 68. The pivot pins 65 on one side of the segmental hinge assembly have an axial passageway 70 which connects transversely with the radial air passage 69 incorporated in support bracket 32 and axially with the air passage 71 in the hinge 31 of the segment 30 and leading to the passageway 68 forming the interior of the segment whose outlet 72 projects the cooling air into the jet stream in any setting of the variable area nozzle. The sheet 67 is cut back to form a rearwardly facing outlet 72 for the air from the segment. This outlet 72 is unobstructed even when the nozzle 29 is in the fully open position as it is then in line with the companion V notch 47 of the exit nozzle 49. Many other well known forms of passing air through the hinge of the segments could be used. So also could other forms of fabricated hollow segments be made, any of which would come within the scope of the claims of this application.

The operating mechanism between the hydraulic jacks 43 and the variable area nozzle 29 is now described in greater detail, although here again it must be understood that the mechanism described is only one form which could be replaced by a form such as a rack and pinion, a chain drive or belt drive, particularly if the initiating force is from a rotating member such as an electric motor. The hydraulic jacks 43 are pivotally anchored at 44 and are connected at their movable member end to the unison ring 40. The connecting links 41 are pivoted at one end to the unison ring and at the other to a lever 73 pivoted on the bracket 74 which is mounted on the support ring 28. This bracket 74 as shown in Figs. 6 and 7 also forms a pivot 74a for the segment operating tension arm 75. A tension arm 75 is also pivoted on the bracket 74 and to the crown of the intersegmental flaps 33 through the bracket 76. A pair of curved links 77 connects the lever 73 with the tension arm 75. Such a mechanism ensures a free pivoting of the segments 30 and for the movement of the hinged crown of the intersegmental flaps 33 relative to the segments 30. The segmental flaps move from a position where they lie parallel with each other when the variable area nozzle is in the full reverse thrust position to a position where the segmental flaps are spread apart in a V notch formation when the nozzle is in the full forward thrust position.

Operation

In the operation of this invention, the gases of combustion are normally restricted in the primary system by the inner or primary nozzle 10 where the velocity of the gases is increased and pressure lowered. By reason of the ejector principle the high velocity of the gas stream creates an area of negative pressure around and in the gas stream causing the entrainment of a stream of cold air to be indrawn from the atmosphere through the ejector intake openings 25 to provide augmentation of the mass flow of the main jet stream and prevent back flow through these openings 25 when the engine is normally in position of forward thrust operation.

The main jet stream now passes through the variable area orifice nozzle 29 whose setting is remotely controlled manually by the pilot or mechanically through automatic means as demanded by altitude or other operating conditions. The setting of the variable area orifice nozzle 29 is here shown as being immediately fixed by the operation of the hydraulic jack 43, but as explained, means other than jacks could be used to perform the same function. When the hydraulic jacks 43 are set to hold the variable area nozzle in forward thrust settings as shown in Fig. 3, the outer surface of the main jet is broken up from a circle defined as it leaves the primary nozzle 10 and now takes on a configuration defined by the V notch configuration of the surface of the variable area nozzle 29. This configuration of the outer surface of the main jet is continued as it leaves the variable area nozzle by reason of the V notches 47 running in the inner surface of the jet pipe into the exit nozzle 49. The alteration of the outer surface of the main jet from a complete circle to a V configuration will to some degree have the effect of cutting down considerably the noise level of the jet stream as it leaves the exit nozzle 49, with benefit to those that have to work around jet planes during warming up operations and take-off.

The variable area orifice nozzle 29 can be operated through various stages to obtain certain degrees of control in the operation of the plane and its engine. Reference is made to Fig. 13 in which the various stages of control hereinafter described, are illustrated. Range A is the normal limits of movement of the variable area orifice nozzle 29 which permits the use of maximum power from the engine for forward thrust operation. The variation of nozzle opening and consequent control of the velocity and mass flow of the main jet in this range are valuable during landing approach where thrust deviation is not required. Thrust value can be reduced in this range while retaining maximum thrust r.p.m. and temperatures. Within this range the brake flaps 45 offer little or no interference with the slip stream of the aircraft and act to limit the size of the ejector intake openings 25a. Range B takes in the full remaining range of operation of the variable area nozzle 29. In any setting within this range a partial percentage of power is available for thrust deviation, depending upon the setting of the nozzle. It is within this range that the brake flaps 45 will operate in conjunction with nozzle 29 to reduce the speed of aircraft without reduction of engine r.p.m. thereby enabling the engine to remain at constant power setting ready for instant change back to full forward thrust operation. Depending on the setting of the nozzle 29 a percentage of the main jet stream will impinge on the forward facing side of the nozzle deflecting that portion through the openings 25 and turning vanes 21 and through the openings 23. The flaps 45 will intensify the forward direction of the gases to increase the value of reverse thrust exerted by the ejected gases. It must be noted that the reaction of both the slip stream and the ejected gases exert a rearwardly directed pressure component on the flaps 45 and this pressure acts through the interconnecting operating mechanism to reduce the loading on the variable area nozzle 29 caused by the main jet. The greater the area of interference of the nozzle 29 with the main jet, the greater the interference of the flaps 45 with the slip stream, so that a partial balance of load is maintained at all times. The deceleration due to reverse thrust is a result of reactive component of forces on the variable area nozzle 29 and the brake flaps 45, these forces being transferred to the aircraft structure via the annular supporting ring 28. The air or liquid stream from the cross vane 54, if fitted, assists in the diversion of the main jet for reverse thrust particularly in the range of maximum reverse thrust as the angle of the turbine like blade walls 56 and 57 are directed in the direction of the forward face of the nozzle 29. It should be noted that maximum reverse thrust is possible at the setting of the nozzle 29 marked at $B_1$ but increased efficiency of deflection is obtained at setting $B_2$. The variation of setting required between the points $B_1$ and $B_2$ will depend to a great extent on the individual design of the thrust varying and reversing device applied to a given prime mover in the neighborhood of the primary nozzle 10 and the secondary air inlet passages at this point. During normal operation of the aircraft in flight the variable area nozzle 29 will be kept within the Range A. In order that the variable area nozzle cannot be inadvertently moved to a position in Range B the controls operating the nozzle will be so arranged that the nozzle cannot move into that part of Range B lying beyond Range C unless the aircraft undercarriage is in the lowered position and, if necessary, touch down of the aircraft through the undercarriage Oleo Leg deflection is accomplished. The operation of the variable area nozzle 29 can be interconnected or otherwise tied in with the engine throttle control to increase idling r.p.m. of the engine when thrust is reversed.

*Range C.*—It is within this range of setting of the variable area nozzle 29 that control between forward and reverse thrust will be exercised, as required in maneuvering the aircraft in the air.

When the variable area nozzle 29 is in the Range A setting, the V notch configuration of the nozzle will result in noise suppression during the period of operation at which it is most desired. The spread of the V notch is gradually reduced as the nozzle is closed to present a smaller opening to the main jet stream, until at the point where the nozzle is at right angles to the axis of the jet stream the V notches have been closed up so that the gases being deflected are not cut up by indentations on the deflecting surface.

The amount of orifice desired in the nozzle 29 when it is at right angles to the axis of the main jet will depend upon the operating characteristics required of the engine at this time such as the percentage of forward thrust required to eliminate back pressure on the engine under all conditions of operations and on the design of the cross vane 54 in relation to the primary nozzle 10 and variable area nozzle 29.

The complete installation is efficiently cooled by cool air passing over all surfaces exposed to the high temperature gases and having all moving parts enveloped in cool air bled from the engine compressor 1 or other source of supply and exhausted at suitable points into the main jet from ejector outlets such as at 24 and 52, if necessary. The cool air fed down the various segments 30 at 68 as shown in Figs. 11 and 12 of the variable nozzle 29 will keep down the temperature of these parts under all operating conditions, and in the worst condition as when the nozzle is in maximum reverse thrust position the cool air in the segments will be assisted in their cooling by the air deflected onto the face of the segments from the cross vane 54.

In an emergency, as in the case of the aircraft overshooting on the landing run, or other similar causes, the variable nozzle or deflector 29 in the reverse thrust position and the brake flaps 45 in the open position, can instantly revert back and be released to the full forward thrust position assisted by the high pressure on the forward face of the variable nozzle 29 when positive thrust is increased to a maximum for retake off.

By the use of the above described invention, not one but many improvements in the operation of jet aircraft are accomplished. The interaction of the variable nozzle and the brake flaps together with the accomplished deflection of the main jet stream combine to produce results that have not hitherto been obtainable, such as a much wider operational range of the aircraft, more efficient operation under changing conditions, such as wider control of rate of descent, speed regulation and fuel consumption, more efficient volumetric control of the gas discharge and consequent control of back pressure on the engine, resulting in a greater measure of speed control without change in the rate of combustion.

This invention can be used equally well with engines equipped with after burners. Where after burners are in operation only during that period when maximum forward thrust is required, such as in Range A above described, the variable nozzle 29 is at maximum opening and is, therefore, not subjected directly to the higher temperatures encountered during such operation.

What I claim is:

1. In a turbo-jet engine in which the gases of combustion are ejected through a nozzle form tail pipe for the purpose of building up a thrust force, in combination, a variable area orifice nozzle within said tail pipe and concentric therewith, said nozzle being formed of an annular flexible diaphragm consisting of a multiplicity of segments hinged at the periphery of the diaphragm and pairs of segments hinged upon themselves and to the first-mentioned segments along the radial edges of said segments, and linkage means connected to said pairs of segments to operate said variable area orifice nozzle through approximately 120° from a position substantially concentric and parallel to the inner surface of the tail pipe to a position beyond a plane at right angles to the axis of said tail pipe.

2. In a turbo-jet engine in which the gases of combustion of the engine are ejected through a nozzle form tail pipe for the purpose of building up a thrust force in combination, a tail pipe of hollow annular construction having a forward fixed primary exhaust nozzle and a rear fixed exit exhaust nozzle formed on its inner surface, a series of openings in said tail pipe immediately rearwardly of the forward primary exhaust nozzle, a variable area orifice nozzle within said tail pipe and located immediately rearwardly of said openings, said variable area orifice nozzle being formed of a multiplicity of segments hinged on the inner surface of said tail pipe and pairs of segments hinged upon themselves and to the first mentioned segments along the radial edges of said segments, said pairs of segments forming a V notch configuration circumferentially of the variable orifice when the orifice is open or partly open and a V notch in the inner surface of said tail pipe matching in configuration the V notching of the variable nozzle when the nozzle is fully open and extending rearwardly towards the rear exit exhaust nozzle of the engine.

3. In a turbo-jet engine in which the gases of combustion are ejected through a nozzle form tail pipe for the purpose of building up a thrust force in combination, a tail pipe of hollow annular construction having a forward fixed primary exhaust nozzle and a rear fixed exit exhaust nozzle formed on its inner surface, a series of openings in said tail pipe immediately rearwardly of the forward primary exhaust nozzle, a variable area orifice nozzle within said tail pipe and located immediately rearwardly of said openings, said variable area orifice nozzle being formed of a multiplicity of segments hinged on the inner surface of said tail pipe and pairs of segments hinged upon themselves and to the first mentioned segments along the radial edges of said segments, said pairs of segments forming a V notch configuration circumferentially of the variable orifice when the orifice is open or partly open and a V notch in the inner surface of said tail pipe matching in configuration the V notching of the variable area orifice nozzle when the nozzle is fully open and extending rearwardly towards the rear exit exhaust nozzle of the engine, and means to operate said variable area orifice nozzle through a path from a position of maximum opening approximately the full inner diameter of the tail pipe to a position of minimum orifice opening in a plane at right angles to the axis of the tail pipe.

4. In a turbo-jet engine as set forth in claim 3, wherein the openings in the tail pipe are projected outwardly and forwardly to the atmosphere.

5. In a turbo-jet engine as set forth in claim 4, wherein the variable area orifice nozzle can be moved into a position forming a forwardly projected cone deflecting the gases of combustion out through the openings in the tail pipe.

6. In a turbo-jet engine in which the gases of combustion of the engine are ejected through a nozzle form tail pipe for the purpose of building up a thrust force in combination, a tail pipe of hollow annular construction having a forward fixed primary exhaust nozzle and a rear fixed exit exhaust nozzle formed on its inner side, a series of openings in said tail pipe immediately rearwardly of the forward primary exhaust nozzle, a variable area orifice nozzle within said tail pipe and located immediately rearwardly of said variable area orifice openings, said nozzle being formed of a multiplicity of segments hinged on the inner surface of said tail pipe and pairs of segments hinged upon themselves and to the first mentioned segments along the radial edges of said segments, said pairs of segments forming a V notch configuration circumferentially of the variable orifice when the orifice is open or partly open, V notches in the inner surface of said tail pipe matching in configuration the V notching of the variable area orifice nozzle when the nozzle is fully open and extending rearwardly towards the rear exit exhaust nozzle of the engine, means to operate said variable area orifice nozzle through a path from a position of maximum opening approximately the full inner diameter of the tail pipe to a position of minimum orifice opening in a plane at right angles to the axis of the tail pipe, and brake flaps located at the said opening in the tail pipe synchronized in movement with the said variable area orifice nozzle, said brake flaps partly sealing off the openings in the tail pipe when the variable area orifice nozzle is in the fully open position to impart added forward deflection of the gases of combustion directed through the openings in the tail pipe when the variable area orifice nozzle opening is decreased.

7. In a turbo-jet engine as set forth in claim 6, in which the pressure exerted on the brake flaps by the ejected gases and by the slip stream are utilized to reduce the operating loads on the variable area orifice nozzle caused by the pressure of the main jet passing out through the primary exhaust nozzle.

8. In a turbo-jet engine as set forth in claim 7, in which the mechanism operating said variable area orifice nozzle and brake flaps is located within the hollow annular tail pipe of the engine and is cooled by a stream of cool air.

9. In a turbo-jet engine as set forth in claim 8, in which the operating mechanism synchronously controls the movement of the variable area orifice nozzle and the brake flaps to regulate and modulate the performance of the aircraft in which the turbo-jet engine is installed without effecting a reduction of engine r.p.m.

10. In a turbo-jet engine in which the gases of combustion of the engine are ejected through a nozzle form tail pipe for the purpose of building up a thrust force in combination, a tail pipe of hollow annular construction having a forward fixed primary exhaust nozzle and a rear fixed exit exhaust nozzle formed on its inner side, a series of openings in said tail pipe immediately rearwardly of the forward primary exhaust nozzle, a variable area orifice nozzle within said tail pipe and located immediately rearwardly of said variable area orifice openings, said nozzle being formed of a multiplicity of segments hinged on the inner surface of said tail pipe and pairs of segments hinged upon themselves and to the first mentioned segments along the radial edges of said segments, said pairs of segments forming a V notch configuration circumferentially of the variable area orifice nozzle when the orifice is open or partly open, V notches in the inner surface of said tail pipe matching in configuration the V notching of the variable area orifice nozzle when the nozzle is fully open and extending rearwardly towards the rear exit exhaust nozzle of the engine, means to operate said variable area orifice nozzle through a path from a position of maximum opening approximately the full inner diameter of the tail pipe to a position of minimum orifice opening in a plane at right angles to the axis of the tail pipe, and an air jet located across the axis of the tail pipe immediately forward of the maximum forward position of the variable area orifice nozzle adapted, when the nozzle is in its maximum forward position to assist the nozzle in deflecting the gases of combustion of the engine out through the openings in the tail pipe.

11. In a turbo-jet engine as set forth in claim 10, in which the air jet is from a hollow apertured pipe openly connected with the interior of the hollow tail pipe and whose walls are formed to divert the flow of air into a predetermined path against the forward face of the variable area orifice nozzle and towards the openings in the tail pipe.

12. In a turbo-jet engine in which the gases of combustion of the engine are ejected through a nozzle form tail pipe for the purpose of building up a thrust force in combination, a tail pipe of hollow annular construction having a forward fixed primary exhaust nozzle and a rear fixed exit exhaust nozzle formed on its inner side, a series of openings in said tail pipe immediately rearwardly of the primary exhaust nozzle, a variable area orifice nozzle within said tail pipe and located immediately rearwardly of said openings, said variable area orifice nozzle being formed of a multiplicity of segments hinged on the inner surface of said tail pipe and pairs of segments hinged upon themselves and to the first mentioned segments along the radial edges of said segments, said pairs of segments forming a V notch configuration circumferentially of the variable area orifice nozzle when the orifice is open or partly open, V notches in the inner surface of said tail pipe, matching in configuration the V notching of the variable area orifice nozzle when the said nozzle is fully open and extending rearwardly towards the rear exit exhaust nozzle of the engine, means to operate said variable area orifice nozzle through a path from a position of maximum opening approximately the full inner diameter of the tail pipe to a position of minimum orifice opening in a plane at right angles to the axis of the tail pipe, brake flaps located at the said openings in the tail pipe synchronized in movement with the variable area orifice nozzle, said brake flaps partly sealing off the openings in the tail pipe when the variable area orifice nozzle is in the fully open position and adding increased forward deflection of the gases of combustion directed through the openings in the tail pipe when the variable area orifice nozzle opening is decreased, and an air jet located across the axis of the tail pipe immediately forward of the maximum forward position of the variable area orifice nozzle adapted, when the said nozzle is in that position, to assist the nozzle in deflecting the gases of combustion of the engine out through the openings in the tail pipe to said brake flaps.

References Cited in the file of this patent
UNITED STATES PATENTS

| | | |
|---|---|---|
| 2,510,506 | Lindhagen | June 6, 1950 |
| 2,593,420 | Diehl | Apr. 22, 1952 |
| 2,620,622 | Lundberg | Dec. 9, 1952 |
| 2,637,164 | Robson et al. | May 5, 1953 |
| 2,681,548 | Kappus | June 22, 1954 |
| 2,699,645 | Oulianoff et al. | Jan. 18, 1955 |
| 2,770,944 | Jordan | Nov. 20, 1956 |

FOREIGN PATENTS

| | | |
|---|---|---|
| 503,064 | Belgium | May 31, 1951 |